United States Patent
Noguchi

(10) Patent No.: US 10,623,100 B2
(45) Date of Patent: Apr. 14, 2020

(54) DIGITAL OPTICAL COMMUNICATION SYSTEM, METHOD FOR CONTROLLING DIGITAL OPTICAL COMMUNICATION SYSTEM, AND RECORDING MEDIUM

(71) Applicant: NEC Corporation, Tokyo (JP)

(72) Inventor: Hidemi Noguchi, Tokyo (JP)

(73) Assignee: NEC CORPORATION, Minato, ku, Tokyo (JP)

( * ) Notice: Subject to any disclaimer, the term of this patent is extended or adjusted under 35 U.S.C. 154(b) by 0 days.

(21) Appl. No.: 16/099,931

(22) PCT Filed: May 8, 2017

(86) PCT No.: PCT/JP2017/017374
§ 371 (c)(1),
(2) Date: Nov. 8, 2018

(87) PCT Pub. No.: WO2017/195726
PCT Pub. Date: Nov. 16, 2017

(65) Prior Publication Data
US 2019/0140740 A1    May 9, 2019

(30) Foreign Application Priority Data
May 10, 2016 (JP) ................................ 2016-094435

(51) Int. Cl.
*H04B 10/2507* (2013.01)
*H04B 10/564* (2013.01)
(Continued)

(52) U.S. Cl.
CPC ......... *H04B 10/2507* (2013.01); *H04B 10/27* (2013.01); *H04B 10/40* (2013.01); *H04B 10/564* (2013.01); *H04B 10/616* (2013.01)

(58) Field of Classification Search
None
See application file for complete search history.

(56) References Cited

U.S. PATENT DOCUMENTS

| 9,331,780 B1* | 5/2016 | Zhou ...................... H04B 10/25 |
| 2015/0139649 A1* | 5/2015 | Kikuchi .................. H04J 14/06 398/65 |
| 2015/0236795 A1 | 8/2015 | Malouin et al. |

FOREIGN PATENT DOCUMENTS

| JP | 2011-055088 A | 3/2011 |
| JP | 2015-103840 A | 6/2015 |
| WO | 2007/086123 A1 | 8/2007 |

OTHER PUBLICATIONS

International Search Report for PCT/JP2017/017374 dated Jul. 18, 2017 [PCT/ISA/210].

(Continued)

*Primary Examiner* — David W Lambert
(74) *Attorney, Agent, or Firm* — Sughrue Mion, PLLC

(57) ABSTRACT

In order to enable flexible and efficient operations according to various electric power circumstances, a digital optical communication system 1 is provided with multiple optical transfer apparatuses 2, 3 and a communication control unit 4. The optical transfer apparatuses 2, 3 respectively house optical transmission/reception devices 10, 20 each including a reception-side waveform equalization processing unit 12 and a transmission-side waveform equalization processing unit 11 that perform, respectively on the reception side and on the transmission side, equalization processing for compensating waveform distortion that occurs on transfer paths 5, 6. The communication control unit 4 controls, on the basis of information about the amounts of power that can be supplied to the optical transfer apparatuses 2, 3, the reception-side waveform equalization processing unit 12 and the transmission-side waveform equalization processing unit 11 such that, between the optical transfer apparatuses 2, 3 communicating with each other via the transfer paths 5, 6, either the transmission-side waveform equalization processing unit 11 in the optical transmission/reception device of (Continued)

one of the optical transfer apparatuses or the reception-side waveform equalization processing unit 12 in the optical transmission/reception device of the other optical transfer apparatus performs the equalization processing.

14 Claims, 8 Drawing Sheets

(51) Int. Cl.
     *H04B 10/27*     (2013.01)
     *H04B 10/40*     (2013.01)
     *H04B 10/61*     (2013.01)

(56) References Cited

OTHER PUBLICATIONS

Written Opinion for PCT/JP2017/017374 dated Jul. 18, 2017 [PCT/ISA/237].

\* cited by examiner

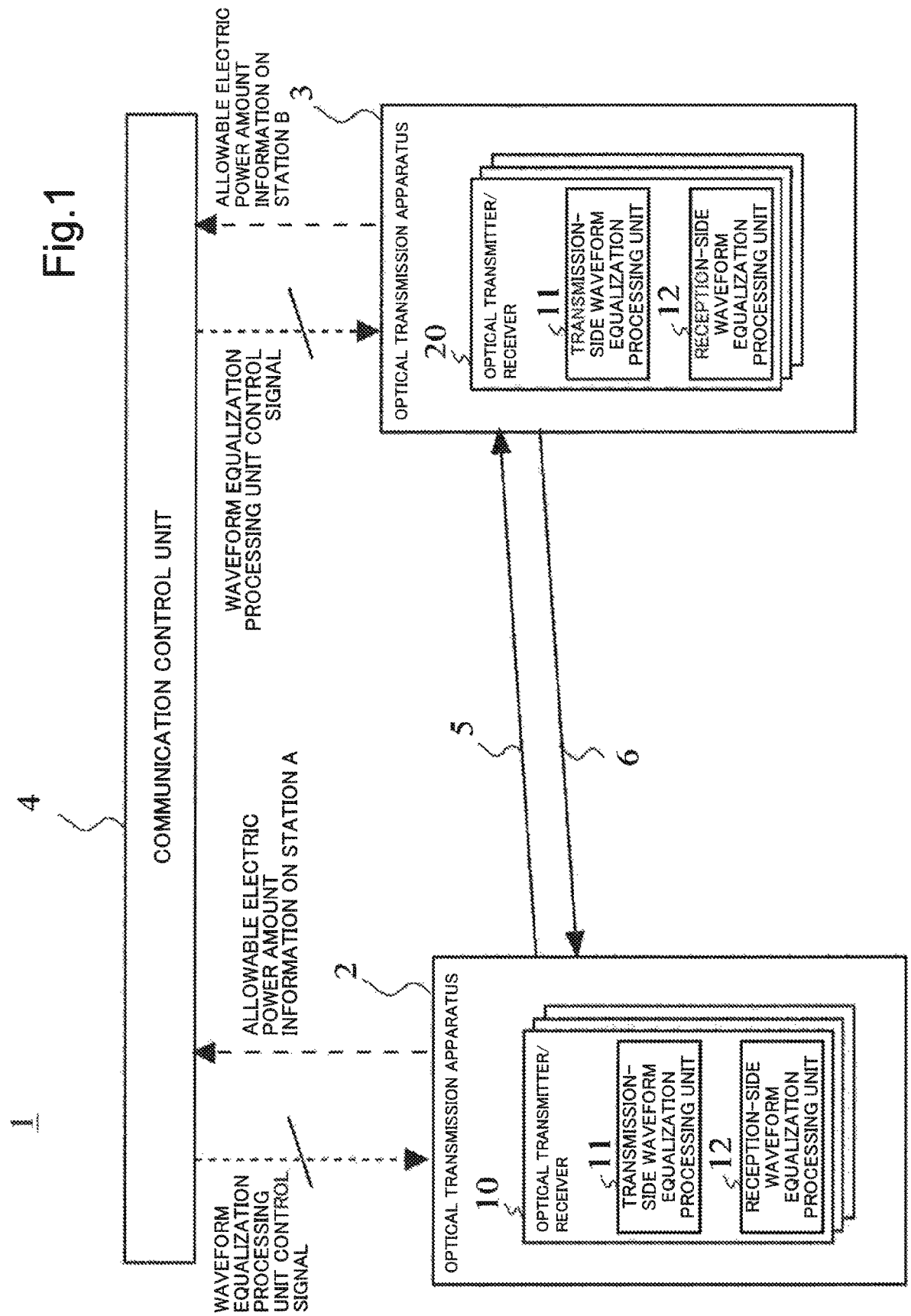

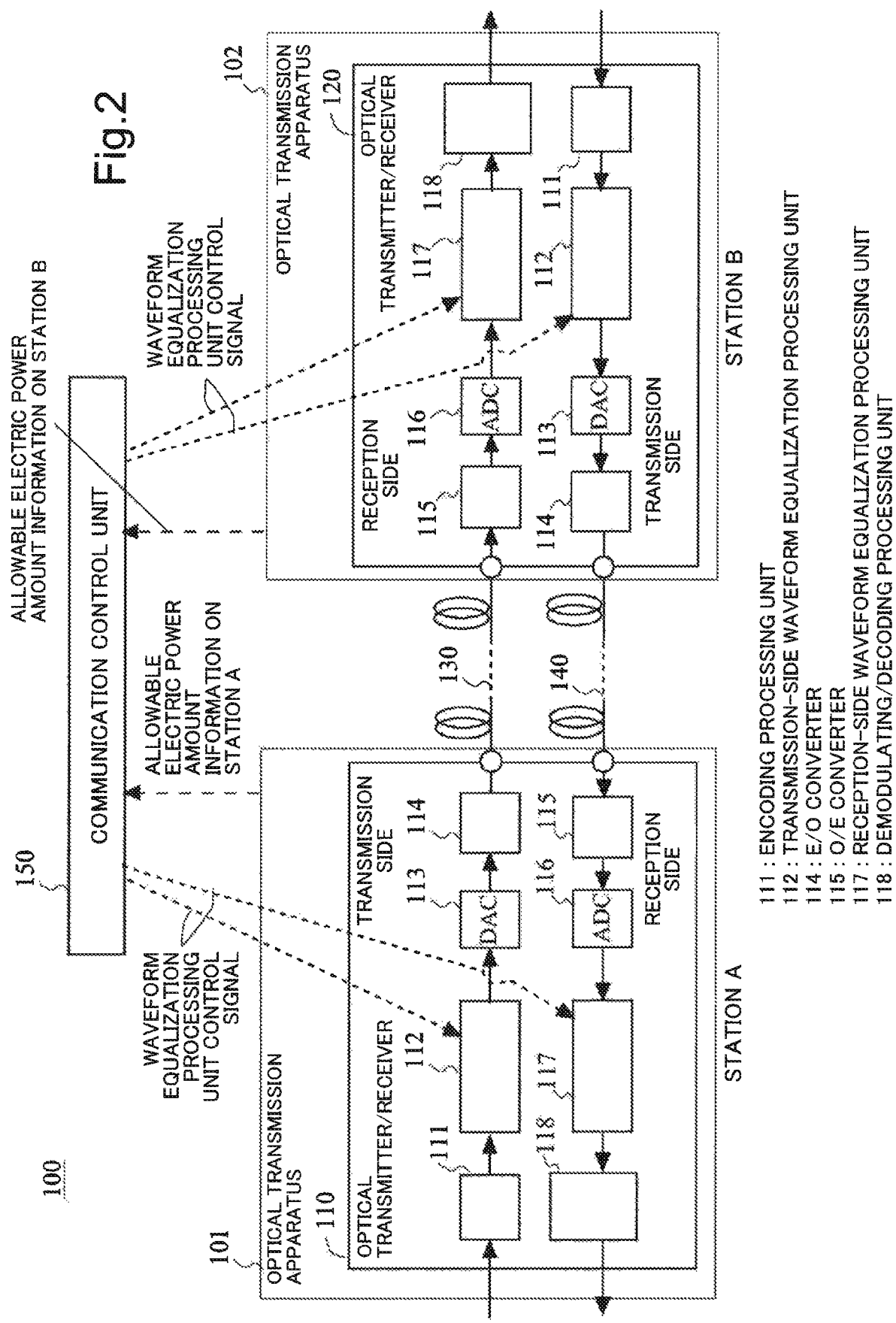

Fig.3

|  | TRANSMISSION-SIDE WAVEFORM EQUALIZATION PROCESSING UNIT | RECEPTION-SIDE WAVEFORM EQUALIZATION PROCESSING UNIT |
| --- | --- | --- |
| SETTING OF WAVEFORM EQUALIZATION PROCESSING UNIT CONTROL SIGNAL WITH RESPECT TO STATION A | DISABLE | ENABLE |
| SETTING OF WAVEFORM EQUALIZATION PROCESSING UNIT CONTROL SIGNAL WITH RESPECT TO STATION B | DISABLE | ENABLE |

Fig.4

|  | TRANSMISSION-SIDE WAVEFORM EQUALIZATION PROCESSING UNIT | RECEPTION-SIDE WAVEFORM EQUALIZATION PROCESSING UNIT |
| --- | --- | --- |
| SETTING OF WAVEFORM EQUALIZATION PROCESSING UNIT CONTROL SIGNAL WITH RESPECT TO STATION A | ENABLE | ENABLE |
| SETTING OF WAVEFORM EQUALIZATION PROCESSING UNIT CONTROL SIGNAL WITH RESPECT TO STATION B | DISABLE | DISABLE |

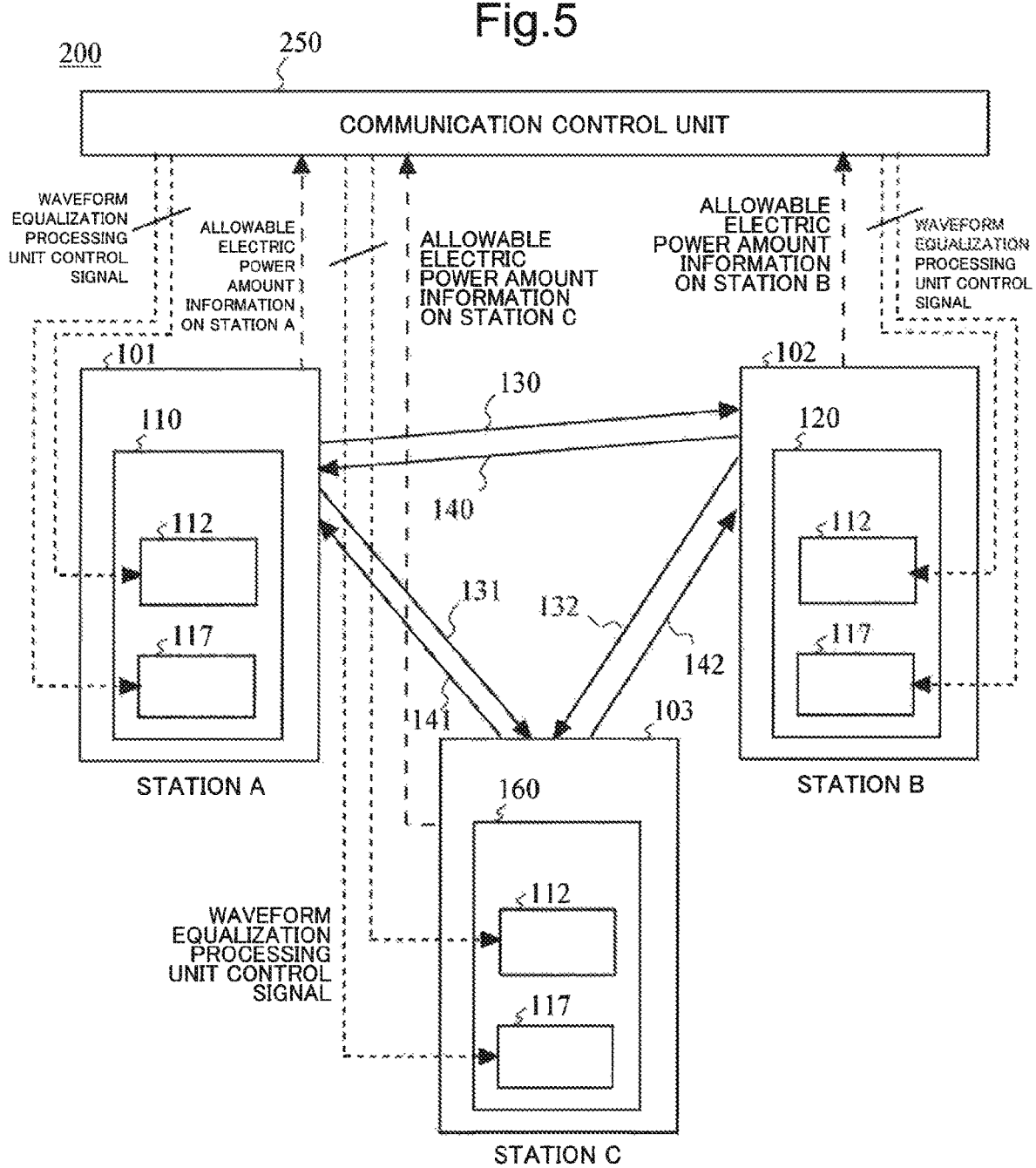

Fig.6

|  | TRANSMISSION-SIDE WAVEFORM EQUALIZATION PROCESSING UNIT | RECEPTION-SIDE WAVEFORM EQUALIZATION PROCESSING UNIT |
|---|---|---|
| SETTING OF WAVEFORM EQUALIZATION PROCESSING UNIT CONTROL SIGNAL WITH RESPECT TO STATION A | DISABLE | DISABLE |
| SETTING OF WAVEFORM EQUALIZATION PROCESSING UNIT CONTROL SIGNAL WITH RESPECT TO STATION B | DISABLE | DISABLE |
| SETTING OF WAVEFORM EQUALIZATION PROCESSING UNIT CONTROL SIGNAL WITH RESPECT TO STATION C | ENABLE | ENABLE |

Fig.7

|  | TRANSMISSION-SIDE WAVEFORM EQUALIZATION PROCESSING UNIT | RECEPTION-SIDE WAVEFORM EQUALIZATION PROCESSING UNIT |
|---|---|---|
| SETTING OF WAVEFORM EQUALIZATION PROCESSING UNIT CONTROL SIGNAL WITH RESPECT TO STATION A | ENABLE | ENABLE |
| SETTING OF WAVEFORM EQUALIZATION PROCESSING UNIT CONTROL SIGNAL WITH RESPECT TO STATION B | ENABLE | ENABLE |
| SETTING OF WAVEFORM EQUALIZATION PROCESSING UNIT CONTROL SIGNAL WITH RESPECT TO STATION C | DISABLE | DISABLE |

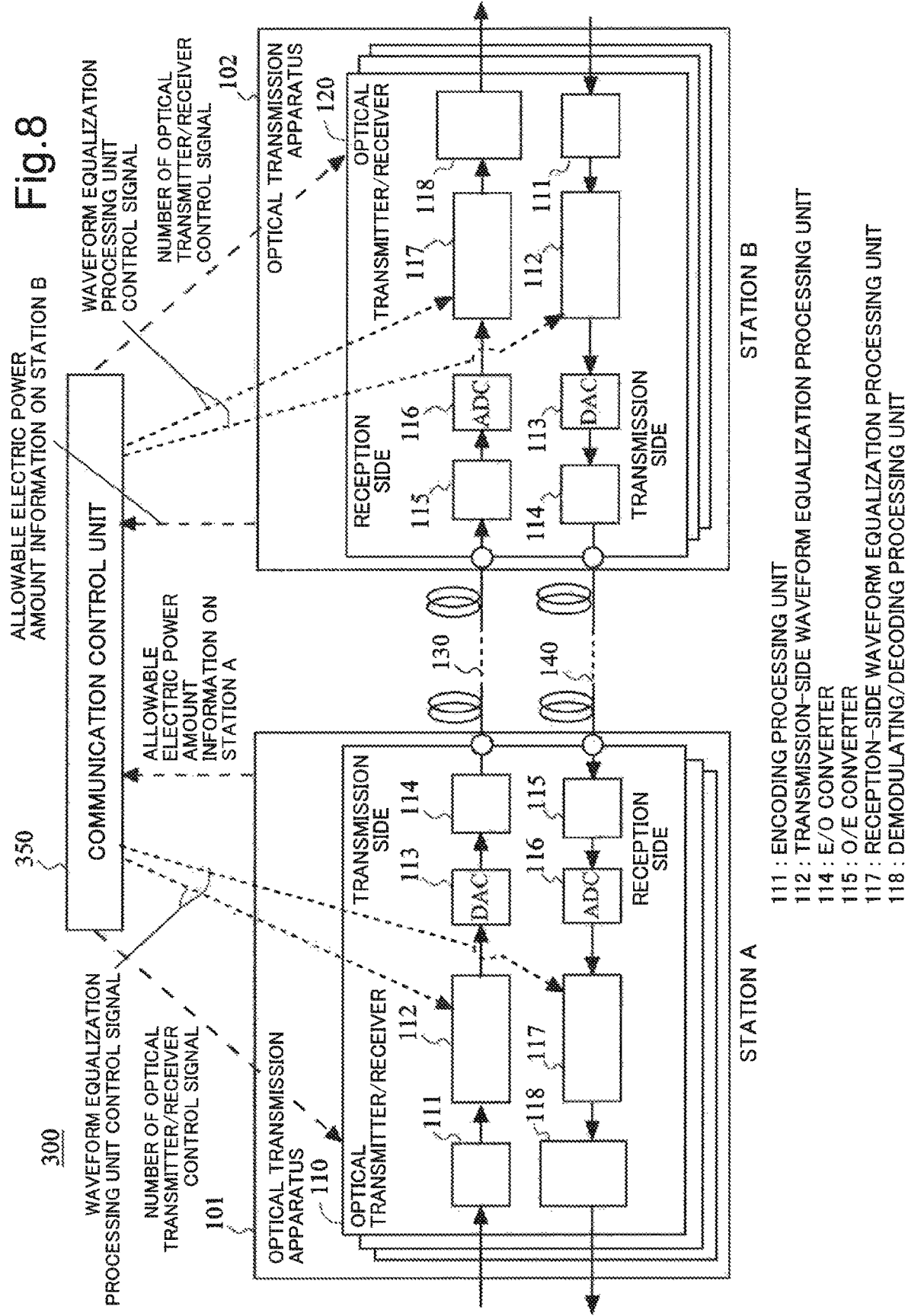

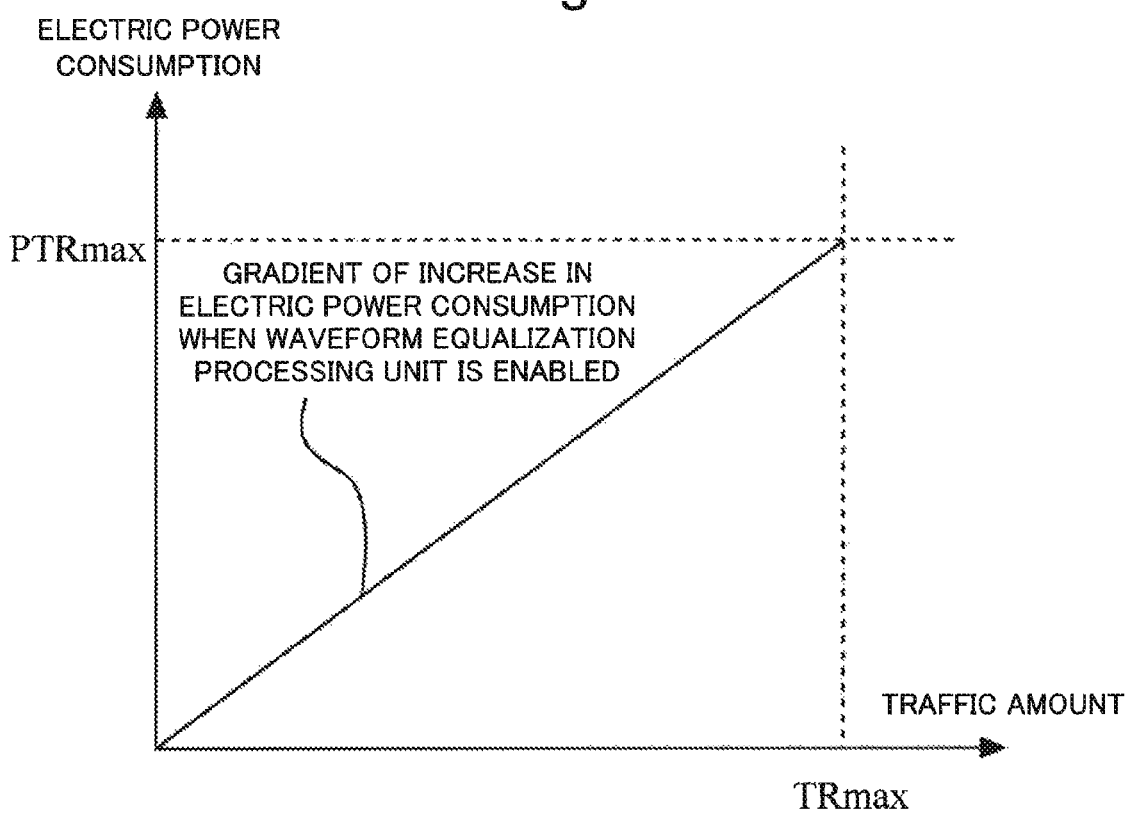

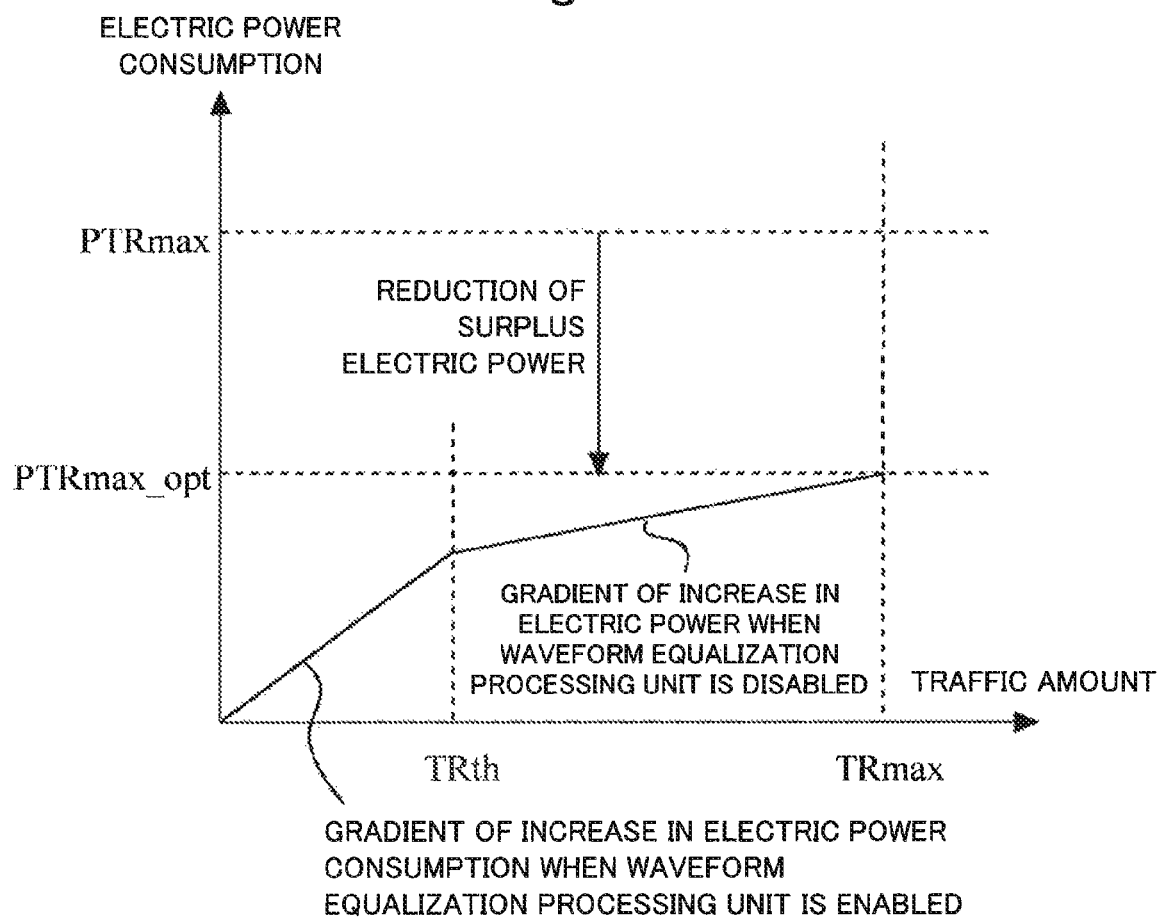

DIGITAL OPTICAL COMMUNICATION SYSTEM, METHOD FOR CONTROLLING DIGITAL OPTICAL COMMUNICATION SYSTEM, AND RECORDING MEDIUM

CROSS REFERENCE TO RELATED APPLICATIONS

This application is a National Stage of International Application No. PCT/JP2017/017374 filed May 8, 2017, claiming priority based on Japanese Patent Application No. 2016-094435 filed May 10, 2016, the disclosure of which is incorporated herein in its entirety by reference.

TECHNICAL FIELD

The present invention relates to a digital optical communication system, a method for controlling a digital optical communication system, and a recording medium.

BACKGROUND ART

In recent years, an optical communication system (digital optical communication system) based on a digital signal processing technique such as a digital coherent transmission technique is put into practical use. In a digital optical communication system as described above, linear waveform distortion occurring from an influence of wavelength dispersion of an optical fiber being a transmission path is compensated by performing waveform equalization processing with use of a digital signal processing circuit in an optical transmitter/receiver (line card) of an optical transmission apparatus. By performing waveform equalization processing with use of a digital signal processing circuit as described above, it becomes possible to perform high-accuracy waveform distortion compensation, and it becomes possible to implement an optical communication system having programmability compatible for transmission paths of various types.

PTL 1 describes a digital optical communication system including a compensation unit (DCM: Dispersion Compensation Module) for compensating a part of wavelength dispersion which is occurring in an optical signal transmitted by a transmission path, a reception unit for receiving an optical signal after compensation by the compensation unit, a conversion unit for converting an optical signal received by the reception unit into an electric digital signal, and a digital processing unit (DSP: Digital Signal Processor) for compensating, by digital signal processing, wavelength dispersion remaining in the digital signal.

CITATION LIST

Patent Literature

[PTL 1] Japanese Unexamined Patent Application Publication No. 2011-055088

SUMMARY OF INVENTION

Technical Problem

It is reported that, in the digital optical communication system described in PTL 1, it is possible to reduce an amount of wavelength dispersion compensation required in the DSP, and prevent an increase in circuit scale of the DSP, by causing the DCM and the DSP to perform wavelength dispersion compensation of an optical signal. However, in the digital optical communication system described in PTL 1, there is a problem that, when a restriction occurs in an allowable amount of electric power of a station due to some cause in a part of a plurality of stations for housing optical transmission apparatuses including optical transmitters/receivers, it is not possible to supply an amount of electric power necessary for operating an optical transmitter/receiver in the station, and it is not possible to perform communication with the station.

Further, in the digital optical communication system described in PTL 1, when an operation rate of an optical transmitter/receiver in a station greatly changes depending on a traffic condition, it is necessary to install an electric power facility, based on an amount of electric power (peak amount of electric power) when the optical transmitter/receiver is fully operated. Thus, there is a problem that an investment cost for an electric power facility may rise.

In view of the above-described problems, an object of the present invention is to provide a digital optical communication system, a method for controlling a digital optical communication system, and a recording medium, which are capable of flexibly and efficiently performing an operation depending on various electric power circumstances.

Solution to Problem

A digital optical communication system according to the present invention comprises a plurality of optical transmission apparatuses each including an optical transmitter/receiver including reception-side waveform equalization processing unit for performing, on a reception side, equalization processing of compensating waveform distortion occurring in a transmission path, and transmission-side waveform equalization processing unit for performing, on a transmission side, equalization processing of compensating waveform distortion occurring in a transmission path, and communication control unit for controlling the reception-side waveform equalization processing unit and the transmission-side waveform equalization processing unit in the optical transmitter/receiver of each optical transmission apparatus, wherein the communication control unit controls the reception-side waveform equalization processing unit and the transmission-side waveform equalization processing unit, in such a way as to cause either the transmission-side waveform equalization processing unit in the optical transmitter/receiver of one of optical transmission apparatuses, or the reception-side waveform equalization processing unit in the optical transmitter/receiver of another of optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section.

A method according to the present invention is the method for controlling a digital optical communication system is provided with a plurality of optical transmission apparatuses each including an optical transmitter/receiver including reception-side waveform equalization processing unit for performing, on a reception side, equalization processing of compensating waveform distortion occurring in a transmission path, and transmission-side waveform equalization processing unit for performing, on a transmission side, equalization processing of compensating waveform distortion occurring in a transmission path, and the method comprises a step of controlling the reception-side waveform equalization processing unit and the transmission-side waveform equalization processing unit, in such a way as to cause either the transmission-side waveform equalization processing unit in the optical transmitter/receiver of one of optical transmission apparatuses, or the reception-side waveform equalization processing unit in the optical transmitter/receiver of another of optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section.

A non-transitory computer-readable recording medium according to the present invention records a control program of a digital optical communication system provided with a plurality of optical transmission apparatuses each including an optical transmitter/receiver including reception-side waveform equalization processing unit for performing, on a reception side, equalization processing of compensating waveform distortion occurring in a transmission path, and transmission-side waveform equalization processing unit for performing, on a transmission side, equalization processing of compensating waveform distortion occurring in a transmission path, and the recording medium records the control program causing a computer to execute a step of controlling the reception-side waveform equalization processing unit and the transmission-side waveform equalization processing unit, in such a way as to cause either the transmission-side waveform equalization processing unit in the optical transmitter/receiver of one of optical transmission apparatuses, or the reception-side waveform equalization processing unit in the optical transmitter/receiver of another of optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section.

Advantageous Effect of Invention

According to the present invention, it is possible to flexibly and efficiently perform an operation depending on various electric power circumstances.

BRIEF DESCRIPTION OF DRAWINGS

FIG. 1 is a diagram illustrating an overview of the present invention.

FIG. 2 is a block diagram illustrating a schematic configuration of a digital optical communication system according to a first example embodiment.

FIG. 3 is a table illustrating setting of a waveform equalization unit control signal with respect to each station in a normal state in the digital optical communication system according to the first example embodiment.

FIG. 4 is a table illustrating setting of a waveform equalization unit control signal with respect to each station, when an allowable amount of electric power of a station B falls below a required amount of electric power of an optical transmitter/receiver in a normal state, in the digital optical communication system according to the first example embodiment.

FIG. 5 is a block diagram illustrating a schematic configuration of a digital optical communication system according to a second example embodiment.

FIG. 6 is a table illustrating setting of a waveform equalization unit control signal with respect to each station, when an allowable amount of electric power of each of stations A and B falls below a required amount of electric power of an optical transmitter/receiver in a normal state respectively, in the digital optical communication system according to the second example embodiment.

FIG. 7 is a table illustrating setting of a waveform equalization unit control signal with respect to each station, when a transmission path between an optical transmission apparatus of the station A and an optical transmission apparatus of the station B is disconnected, in the digital optical communication system according to the second example embodiment.

FIG. 8 is a block diagram illustrating a schematic configuration of a digital optical communication system according to a third example embodiment.

FIG. 9 is a graph illustrating a relationship between a traffic amount (proportional to the number of operating optical transmitters/receivers) of an optical transmission apparatus to be housed in a station, and electric power consumption in an existing optical communication system.

FIG. 10 is a graph illustrating a relationship between a traffic amount (proportional to the number of operating optical transmitters/receivers) of an optical transmission apparatus to be housed in each of stations A and B, and electric power consumption in the optical communication system according to the third example embodiment.

EXAMPLE EMBODIMENT

Features of Present Invention

Prior to description on example embodiments of the present invention, first of all, an overview of features of the present invention is described.

FIG. 1 is a diagram illustrating an overview of the present invention. As illustrated in FIG. 1, a digital optical communication system 1 according to the present invention includes a plurality of optical transmission apparatuses 2 and 3, and a communication control unit 4. The optical transmission apparatuses 2 and 3 respectively include optical transmitters/receivers 10 and 20, each of which includes a reception-side waveform equalization processing unit 12 for performing, on a reception side, equalization processing of compensating waveform distortion occurring in transmission paths 5 and 6, and a transmission-side waveform equalization processing unit 11 for performing, on a transmission side, equalization processing of compensating waveform distortion occurring in the transmission paths 5 and 6. The communication control unit 4 controls the reception-side waveform equalization processing unit 12 and the transmission-side waveform equalization processing unit 11 in an optical transmitter/receiver of each optical transmission apparatus.

The communication control unit 4 controls the reception-side waveform equalization processing unit 12 and the transmission-side waveform equalization processing unit 11 by a control signal (waveform equalization processing unit control signal), in such a way as to cause either the transmission-side waveform equalization processing unit 11 in an optical transmitter/receiver of one of optical transmission apparatuses, or the reception-side waveform equalization processing unit 12 in an optical transmitter/receiver of the other of the optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section. Herein, respective transmission paths included in a predetermined transmission section, for example, indicate all communication paths (a mesh network including stations A and B) through which communication is enabled between stations A and B, when communication is performed between the stations A and B.

In other words, the communication control unit 4 controls the transmission-side waveform equalization processing unit 11 of the optical transmitter/receiver 10 and the reception-side waveform equalization processing unit 12 of the optical transmitter/receiver 20 by a control signal (waveform equalization processing unit control signal), in such a way as to cause either the transmission-side waveform equalization processing unit 11 of the optical transmitter/receiver 10 in the optical transmission apparatus 2, or the reception-side waveform equalization processing unit 12 of the optical transmitter/receiver 20 in the optical transmission apparatus 3, to perform equalization processing, based on information (allowable electric power information on stations A and B) relating to an amount of electric power (allowable amount of electric power) suppliable to the optical transmission apparatus 2 in the station A and to the optical transmission apparatus 3 in the station B, between the optical transmission apparatus 2 and the optical transmission apparatus 3 communicating with each other by the transmission path 5.

Likewise, the communication control unit 4 controls the transmission-side waveform equalization processing unit 11 of the optical transmitter/receiver 20 and the reception-side waveform equalization processing unit 12 of the optical transmitter/receiver 10 by a control signal (waveform equalization processing unit control signal), in such a way as to cause either the transmission-side waveform equalization processing unit 11 of the optical transmitter/receiver 20 in the optical transmission apparatus 3, or the reception-side waveform equalization processing unit 12 of the optical transmitter/receiver 10 in the optical transmission apparatus 2, to perform equalization processing, based on information relating to an amount of electric power suppliable to the optical transmission apparatus 2 in the station A and to the optical transmission apparatus 3 in the station B, between the optical transmission apparatus 2 and the optical transmission apparatus 3 communicating with each other by the transmission path 6.

A waveform equalization processing unit for compensating linear waveform distortion occurring in a transmission path is a functional block that occupies a large part of electric power consumption in a digital optical transmitter/receiver of an optical transmission apparatus. Fundamentally, a similar compensation effect is acquired for linear waveform distortion occurring in a transmission path, when compensation is performed either on a transmission side or a reception side of a digital optical transmitter/receiver, in terms of characteristics thereof. According to the present invention, by performing waveform equalization processing either on a transmission side of one of optical transmission apparatuses, or a reception side of the other of the optical transmission apparatuses, communicating with each other by a certain transmission path, it is possible to flexibly and efficiently operate a digital optical communication system depending on various electric power circumstances, such as an allowable amount of electric power in a station in which an optical transmission apparatus is housed, without increasing a total required amount of electric power in the digital optical communication system.

First Example Embodiment

In the following, a first example embodiment according to the present invention is described with reference to the drawings.

First of all, a configuration of a digital optical communication system according to the first example embodiment is described. Herein, description is made by a digital optical communication system constituted by between stations (between stations A and B) at two points, as an example.

FIG. 2 is a block diagram illustrating a schematic configuration of a digital optical communication system 100. As illustrated in FIG. 2, the digital optical communication system 100 includes an optical transmitter/receiver 110 of an optical transmission apparatus 101 housed in the station A, an optical transmitter/receiver 120 of an optical transmission apparatus 102 housed in the station B, transmission path 130, transmission path 140, and a communication control unit 150 for overviewing (monitoring) and controlling communication in each of a plurality of optical transmission apparatuses.

A transmission side in the optical transmitter/receiver 110 of the optical transmission apparatus 101 includes an encoding processing unit 111 for encoding a transmission signal, a transmission-side waveform equalization processing unit 112, a digital to analog converter (DAC) 113 for converting an encoded digital signal into an analog electric signal, and an electric-optic (E/O) converter 114 for converting an analog electric signal into an optical transmission signal. Further, a transmission side in the optical transmitter/receiver 120 of the optical transmission apparatus 102 has a similar configuration to the transmission side in the optical transmitter/receiver 110 of the station A.

A reception side in the optical transmitter/receiver 110 of the optical transmission apparatus 101 includes an optic-electric (O/E) converter 115 for converting a received optical signal into an analog electric signal, an analog to digital converter (ADC) 116 for further converting a converted analog electric signal into a digital signal, a reception-side waveform equalization processing unit 117, and a demodulating/decoding processing unit 118 for performing demodulation and decoding with respect to a signal which has undergone the above-described waveform distortion compensation. Further, a reception side of the optical transmitter/receiver 120 of the optical transmission apparatus 102 has a similar configuration to the reception side in the optical transmitter/receiver 110 of the optical transmission apparatus 101.

The transmission-side waveform equalization processing unit 112 and the reception-side waveform equalization processing unit 117 compensate linear waveform distortion occurring in a transmission path, by receiving a digitized reception signal, by means of digital signal processing. The transmission-side waveform equalization processing unit 112 and the reception-side waveform equalization processing unit 117 are one of functional blocks in which electric power consumption is largest among functional blocks constituting an optical transmitter/receiver. Note that the transmission-side waveform equalization processing unit 112 and the reception-side waveform equalization processing unit 117 have equivalent equalization processing performances.

After undergoing a series of processing on a transmission side, an optical transmission signal acquired on the transmission side in the optical transmitter/receiver 110 of the optical transmission apparatus 101 is transmitted to a reception side in the optical transmitter/receiver 120 of the optical transmission apparatus 102 via the transmission path 130 being an optical fiber. Further, after undergoing a series of processing on a transmission side, an optical transmission signal acquired on the transmission side in the optical transmitter/receiver 120 of the optical transmission apparatus 102 is transmitted to a reception side in the optical transmitter/receiver 110 of the optical transmission apparatus 101 via the transmission path 140 being an optical fiber.

The transmission-side waveform equalization processing unit 112 provided on a transmission side, and the reception-side waveform equalization processing unit 117 provided on a reception side are able to disable each other independently of each other by a control signal (waveform equalization processing unit control signal) from the communication control unit 150. Herein, disabling the transmission-side waveform equalization processing unit 112 is suspending electric power supply to the transmission-side waveform equalization processing unit 112, and bypassing the transmission-side waveform equalization processing unit 112. Likewise, disabling the reception-side waveform equalization processing unit 117 is suspending electric power supply to the reception-side waveform equalization processing unit 117, and bypassing the reception-side waveform equalization processing unit 117.

Next, a method for controlling the transmission-side waveform equalization processing unit 112 and the reception-side waveform equalization processing unit 117 by the communication control unit 150 is described.

The communication control unit 150 collects information relating to electric power such as a suppliable amount of electric power in each station. Further, when the communication control unit 150 determines that electric power is sufficiently suppliable in the station A and the station B, and that both an allowable amount of electric power PAmax of the station A and an allowable amount of electric power PBmax of the station B sufficiently exceed a required amount of electric power P of an optical transmitter/receiver (optical transmitter/receiver 110, optical transmitter/receiver 120) (PAmax>P and PBmax>P), the communication control unit 150 sends, to each station, a waveform equalization processing unit control signal in accordance with a table illustrated in FIG. 3. In other words, the communication control unit 150 performs setting in such a way as to disable the transmission-side waveform equalization processing unit 112 and enable the reception-side waveform equalization processing unit 117 both in the station A and the station B. Hereinafter, an operation state on this occasion is referred to as a "normal state", and it is assumed that a required amount of electric power in a normal state in a digital optical transmitter/receiver of each of the station A and the station B is P.

On the other hand, when the communication control unit 150 determines that the allowable amount of electric power PAmax of the station A sufficiently and greatly exceeds the required amount of electric power P of an optical transmitter/receiver in a normal state, but the allowable amount of electric power PBmax of the station B falls below the required amount of electric power P of an optical transmitter/receiver in a normal state (PAmax>P and PBmax<P), the communication control unit 150 sends, to each station, a waveform equalization processing unit control signal in accordance with a table illustrated in FIG. 4. In other words, the communication control unit 150 performs setting in such a way as to disable the transmission-side waveform equalization processing unit 112 and the reception-side waveform equalization processing unit 117 in the optical transmitter/receiver 120 of the station B, and enable the transmission-side waveform equalization processing unit 112 and the reception-side waveform equalization processing unit 117 in the optical transmitter/receiver 110 of the station A.

Thus, in the optical transmitter/receiver 120 of the station B, both the transmission-side waveform equalization processing unit 112 and the reception-side waveform equalization processing unit 117 are disabled, and in the optical transmitter/receiver 110 of the station A, both the transmission-side waveform equalization processing unit 112 and the reception-side waveform equalization processing unit 117 are enabled.

Note that, as a cause for lowering the allowable amount of electric power PBmax of the station B below the required amount of electric power P of an optical transmitter/receiver in a normal state, it is conceived that an allowable amount of electric power is lowered by an occurrence of an emergency such as a disaster, for example.

When waveform equalization processing of applying, to a transmission signal, waveform distortion of a characteristic opposite to a characteristic of the transmission path 130 is performed by the transmission-side waveform equalization processing unit 112 in the optical transmitter/receiver 110 of the station A, waveform distortion applied by waveform equalization processing of the transmission-side waveform equalization processing unit 112, and waveform distortion occurring in the transmission path 130 cancel each other, and a signal free of waveform distortion is acquired on a reception end of the optical transmitter/receiver in the station B. Therefore, since it is not necessary to perform waveform equalization processing in the optical transmitter/receiver 120 of the station B, it is possible to disable the reception-side waveform equalization processing unit 117 in the optical transmitter/receiver 120 of the station B.

Further, in a case where a transmission signal which has not undergone compensation for waveform distortion occurring in the transmission path 140 is received on a reception end of the optical transmitter/receiver 110 in the station A, when the reception-side waveform equalization processing unit 117 in the optical transmitter/receiver 110 of the station A performs waveform equalization processing of applying, to a reception signal, waveform distortion of a characteristic opposite to a characteristic of the transmission path 140, waveform distortion applied by waveform equalization processing of the reception-side waveform equalization processing unit 117, and waveform distortion occurring in the transmission path 140 cancel each other, and it is possible to restore to a correct signal free of waveform distortion. Therefore, it is possible to disable the transmission-side waveform equalization processing unit 112 in the optical transmitter/receiver 120 of the station B.

As described above, in the optical transmitter/receiver 120 of the station B, both the transmission-side waveform equalization processing unit 112 and the reception-side waveform equalization processing unit 117, being functional blocks in which electric power consumption is large, are disabled. Therefore, when it is assumed that a required amount of electric power of the optical transmitter/receiver 120 in the station B is P', P' is smaller than the required amount of electric power P of an optical transmitter/receiver in a normal state (P>P'). Further, P' is smaller than the allowable amount of electric power PBmax of the station B (PBmax>P').

As described above, in the optical transmitter/receiver 110 of the station A, both the transmission-side waveform equalization processing unit 112 and the reception-side waveform equalization processing unit 117, being functional blocks in which electric power consumption is large, are enabled. Therefore, when it is assumed that a required amount of electric power of the optical transmitter/receiver 110 in the station A is P″, P″ is larger than the required amount of electric power P of an optical transmitter/receiver in a normal state (P″>P). However, since the allowable amount of electric power PAmax of the station A sufficiently and greatly exceeds the required amount of electric power P of an optical transmitter/receiver in a normal state, P″ is smaller than the allowable amount of electric power PAmax of the station A (PAmax>P″).

Note that, in a case where the communication control unit 150 determines that the allowable amount of electric power PBmax of the station B sufficiently and greatly exceeds the required amount of electric power P of an optical transmitter/receiver in a normal state, but that the allowable amount of electric power PAmax of the station A falls below the required amount of electric power P of an optical transmitter/receiver in a normal state (PBmax>P and PAmax<P), the communication control unit 150 performs setting opposite to the above-described case where the allowable amount of electric power PAmax of the station A sufficiently and greatly exceeds the required amount of electric power P of an optical transmitter/receiver in a normal state, but where the allowable amount of electric power PBmax of the station B falls below the required amount of electric power P of an optical transmitter/receiver in a normal state. Specifically, the communication control unit 150 performs setting in such a way as to enable the transmission-side waveform equalization processing unit 112 and the reception-side waveform equalization processing unit 117 in the optical transmitter/receiver 120 of the station B, and disable the transmission-side waveform equalization processing unit 112 and the reception-side waveform equalization processing unit 117 in the optical transmitter/receiver 110 of the station A.

As described above, in the present example embodiment, when a state between the optical transmission apparatus 101 and the optical transmission apparatus 102 communicating with each other by the transmission paths 130 and 140 is a normal state (state that electric power is sufficiently suppliable in the station A and the station B), waveform equalization processing is performed by the reception-side waveform equalization processing unit 117 of the optical transmission apparatus 101 in the station A, and the reception-side waveform equalization processing unit 117 of the optical transmission apparatus 102 in the station B. When electric power is sufficiently suppliable only by the station A, waveform equalization processing is performed by the transmission-side waveform equalization processing 112 and the reception-side waveform equalization processing unit 117 of the optical transmission apparatus 101. When electric power is sufficiently suppliable only by the station B, waveform equalization processing is performed by the transmission-side waveform equalization processing 112 and the reception-side waveform equalization processing unit 117 of the optical transmission apparatus 102.

By performing as described above, it becomes possible to maintain communication between the optical transmission apparatus 101 in the station A and the optical transmission apparatus 102 in the station B, even when an allowable amount of electric power of either the station A or the station B is lowered due to some cause. Further, when it is assumed that an amount of electric power required for performing equalization processing is the same between the transmission-side waveform equalization processing unit 112 and the reception-side waveform equalization processing unit 117, since an amount of electric power required for equalization processing remains unchanged in any case, a total required amount of electric power of the digital optical communication system 100 remains unchanged.

As described above, according to the present invention, it becomes possible to operate a digital optical communication system flexibly and efficiently depending on various electric power circumstances.

Second Example Embodiment

In the following, a second example embodiment of the present invention is described with reference to the drawings. Note that portions common to those in the first example embodiment are indicated with common reference signs, and description thereof is omitted. Whereas, in the first example embodiment, a digital optical communication system has a configuration such that there are two stations that perform optical communication, in the present example embodiment, a digital optical communication system has a configuration such that there are three stations that perform optical communication.

First of all, a configuration of a digital optical communication system according to the second example embodiment is described.

FIG. 5 is a block diagram illustrating a schematic configuration of a digital optical communication system 200 according to the second example embodiment. The digital optical communication system 200 includes an optical transmitter/receiver 110 of an optical transmission apparatus 101 housed in a station A, an optical transmitter/receiver 120 of an optical transmission apparatus 102 housed in a station B, an optical transmitter/receiver 160 of an optical transmission apparatus 103 housed in a station C, a transmission path 130 and a transmission path 140 between the optical transmission apparatus 101 and the optical transmission apparatus 102, a transmission path 131 and a transmission path 141 between the optical transmission apparatus 101 and the optical transmission apparatus 103, a transmission path 132 and a transmission path 142 between the optical transmission apparatus 102 and the optical transmission apparatus 103, and a communication control unit 250 for overviewing and controlling a plurality of stations.

Configurations of the optical transmitter/receiver 110 and the optical transmitter/receiver 120 are the same as described in the first example embodiment. However, for simplification, in FIG. 5, only a transmission-side waveform equalization processing unit 112 and a reception-side waveform equalization processing unit 117 are illustrated. Further, a configuration of the optical transmitter/receiver 160 is the same as configurations of the optical transmitter/receiver 110 and the optical transmitter/receiver 120. In FIG. 5, for simplification, also regarding a configuration of the optical transmitter/receiver 160, only the transmission-side waveform equalization processing unit 112 and the reception-side waveform equalization processing unit 117 are illustrated.

When communication is performed between the optical transmission apparatus 101 and the optical transmission apparatus 102, after undergoing a series of processing on a transmission side, an optical transmission signal acquired on the transmission side in the optical transmitter/receiver 110 of the optical transmission apparatus 101 is transmitted to a reception side in the optical transmitter/receiver 120 of the optical transmission apparatus 102 via the transmission path 130 being an optical fiber. Further, after undergoing a series of processing on a transmission side, an optical transmission signal acquired on the transmission side in the optical transmitter/receiver 120 of the optical transmission apparatus 102 is transmitted to a reception side in the optical transmitter/receiver 110 of the optical transmission apparatus 101 via the transmission path 140 being an optical fiber.

When communication is performed between the optical transmission apparatus 101 and the optical transmission apparatus 103, after undergoing a series of processing on a transmission side, an optical transmission signal acquired on the transmission side in the optical transmitter/receiver 110 of the optical transmission apparatus 101 is transmitted to a reception side in the optical transmitter/receiver 160 of the optical transmission apparatus 103 via the transmission path 131 being an optical fiber. Further, after undergoing a series of processing on a transmission side, an optical transmission signal acquired on the transmission side in the optical transmitter/receiver 160 of the optical transmission apparatus 103 is transmitted to a reception side in the optical transmitter/receiver 110 of the optical transmission apparatus 101 via the transmission path 141 being an optical fiber.

When communication is performed between the optical transmission apparatus 102 and the optical transmission apparatus 103, after undergoing a series of processing on a transmission side, an optical transmission signal acquired on the transmission side in the optical transmitter/receiver 120 of the optical transmission apparatus 102 is transmitted to a reception side in the optical transmitter/receiver 160 of the optical transmission apparatus 103 via the transmission path 132 being an optical fiber. Further, after undergoing a series of processing on a transmission side, an optical transmission signal acquired on the transmission side in the optical transmitter/receiver 160 of the optical transmission apparatus 103 is transmitted to a reception side in the optical transmitter/receiver 120 of the optical transmission apparatus 102 via the transmission path 142 being an optical fiber.

Next, a method for controlling the transmission-side waveform equalization processing unit 112 and the reception-side waveform equalization processing unit 117 by the communication control unit 250 is described.

In the following, a case where communication is performed between the optical transmission apparatus 101 in the station A and the optical transmission apparatus 102 in the station B is described as an example.

The communication control unit 250 collects information relating to electric power such as a suppliable amount of electric power in each station. Further, when the communication control unit 250 determines that electric power is sufficiently suppliable in the station A and the station B, and that both an allowable amount of electric power PAmax of the station A and an allowable amount of electric power PBmax of the station B sufficiently exceed a required amount of electric power P of an optical transmitter/receiver (optical transmitter/receiver 110, optical transmitter/receiver 120) (PAmax>P and PBmax>P), the communication control unit 250 sends, to each station, a waveform equalization processing unit control signal in accordance with the table illustrated in FIG. 3, which is described in the first example embodiment. In other words, the communication control unit 250 performs setting in such a way as to disable the transmission-side waveform equalization processing unit 112 and enable the reception-side waveform equalization processing unit 117 both in the station A and the station B. Hereinafter, an operation state on this occasion is referred to as a "normal state", and it is assumed that a required amount of electric power in a normal state in a digital optical transmitter/receiver of each of the station A and the station B is P.

On the other hand, when the communication control unit 250 determines that both the allowable amount of electric power PAmax of the station A and the allowable amount of electric power PBmax of the station B fall below the required amount of electric power P of an optical transmitter/receiver (optical transmitters/receivers 110 and 120) in a normal state (PAmax<P and PBmax<P), and that an allowable amount of electric power PCmax of the station C, which is capable of relaying the station A and the station B, sufficiently exceeds the required amount of electric power P of an optical transmitter/receiver (optical transmitter/receiver 160) (PCmax>P), the communication control unit 250 sends, to the station A, the station B, and the station C, a waveform equalization processing unit control signal in accordance with a table illustrated in FIG. 6.

Specifically, setting is performed in such a way as to disable the transmission-side waveform equalization processing unit 112 and the reception-side waveform equalization processing unit 117 both in the optical transmitter/receiver 110 of the station A and the optical transmitter/receiver 120 of the station B, and enable the transmission-side waveform equalization processing unit 112 and the reception-side waveform equalization processing unit 117 in the optical transmitter/receiver 160 of the station C. In other words, in the optical transmitter/receiver 110 of the station A and in the optical transmitter/receiver 120 of the station B, both the transmission-side waveform equalization processing unit 112 and the reception-side waveform equalization processing unit 117 are disabled, and in the optical transmitter/receiver 160 of the station C, which is capable of relaying the station A and the station B, both the transmission-side waveform equalization processing unit 112 and the reception-side waveform equalization processing unit 117 are enabled.

When it is assumed that a required amount of electric power of the optical transmitter/receiver 110 in the station A is Pa, Pa is smaller than the required amount of electric power P of an optical transmitter/receiver in a normal state (P>Pa). Further, Pa is smaller than the allowable amount of electric power PAmax of the station A (PBmax>Pa).

When it is assumed that a required amount of electric power of the optical transmitter/receiver 120 in the station B is Pb, Pb is smaller than the required amount of electric power P of an optical transmitter/receiver in a normal state (P>Pb). Further, Pb is smaller than the allowable amount of electric power PBmax of the station B (PBmax>Pb).

When it is assumed that a required amount of electric power of the optical transmitter/receiver 110 in the station C is Pc, Pc is larger than the required amount of electric power P of an optical transmitter/receiver in a normal state (P<Pc). However, since the allowable amount of electric power PCmax of the station C sufficiently and greatly exceeds the required amount of electric power P of an optical transmitter/receiver in a normal state, Pc is smaller than the allowable amount of electric power PCmax of the station C (PCmax>Pc).

When communication is performed between the optical transmission apparatus 101 in the station A and the optical transmission apparatus 102 in the station B, in a case where an allowable amount of electric power is lowered both in the station A and the station B, it is not possible to maintain communication by the control method described in the first example embodiment. However, as described above, when an allowable amount of electric power of the station C for relaying the station A and the station B is sufficiently available, it becomes possible to maintain communication between the optical transmission apparatus 101 in the station A and the optical transmission apparatus 102 in the station B by performing relay transmission via the optical transmission apparatus 103 in the station C. Note that, in the present example embodiment, a case where the number of stations for relaying the station A and the station B is one is described. The present example embodiment, however, is not limited to the above. The present example embodiment is similarly applicable to a case where there are two or more relay stations. In other words, a communication control unit controls a reception-side waveform equalization processing unit and a transmission-side waveform equalization processing unit in an optical transmitter/receiver of each optical transmission apparatus included in a predetermined transmission section, by causing one of optical transmission apparatuses included in the predetermined transmission section (herein, between the station A and the station B) to perform equalization processing, so as to change a required amount of electric power of each optical transmission apparatus included in the predetermined transmission section.

In the digital optical communication system 200 according to the present example embodiment, when a failure occurs in the transmission path 130 and the transmission path 140 between the optical transmission apparatus 101 and the optical transmission apparatus 102, and disconnection occurs, it is necessary to perform communication between the optical transmission apparatus 101 in the station A and the optical transmission apparatus 102 in the station B, by relaying the optical transmission apparatus 103 in the station C. In this case, the following control may be performed as far as it is possible to sufficiently supply electric power both in the station A and the station B.

Specifically, it is assumed that the communication control unit 250 collects information relating to a state of a transmission path and information relating to an amount of electric power (allowable amount of electric power) suppliable in each station, determines that the transmission path 130 and the transmission path 140 are disconnected, and determines that an allowable amount of electric power of each station exceeds a required amount of electric power of an optical transmitter/receiver in a normal state. In this case, the communication control unit 250 sends, to the station A and the station B, a waveform equalization unit control signal in accordance with a table illustrated in FIG. 7, and performs setting in such a way as to enable the transmission-side waveform equalization processing unit 112 and the reception-side waveform equalization processing unit 117 both in the optical transmitter/receiver 110 and the optical transmitter/receiver 120. Further, the communication control unit 250 sends, to the station C, a waveform equalization unit control signal in accordance with the table illustrated in FIG. 7, and performs setting in such a way as to disable the transmission-side waveform equalization processing unit 112 and the reception-side waveform equalization processing unit 117 in the optical transmitter/receiver 160 of the station C.

In other words, in the optical transmitter/receiver 110 of the station A and in the optical transmitter/receiver 120 of the station B, both the transmission-side waveform equalization processing unit 112 and the reception-side waveform equalization processing unit 117 are enabled, and in the optical transmitter/receiver 160 of the station C, both the transmission-side waveform equalization processing unit 112 and the reception-side waveform equalization processing unit 117 are disabled. By performing as described above, it becomes possible to suppress electric power load in the station C being a relay station of the station A and the station B.

Third Example Embodiment

In the following, a third example embodiment of the present invention is described with reference to the drawings. Note that portions common to those in the first example embodiment are indicated with common reference signs, and description thereof is omitted.

FIG. 8 is a block diagram illustrating a schematic configuration of a digital optical communication system 300 according to the third example embodiment. As illustrated in FIG. 8, a schematic configuration of the digital optical communication system 300 according to the third example embodiment is basically the same as the schematic configuration of the digital optical communication system 100 in the first example embodiment described by using FIG. 2. The digital optical communication system 300 according to the third example embodiment is different from the digital optical communication system 100 according to the first example embodiment in a method for controlling a transmission-side waveform equalization processing unit 112 and a reception-side waveform equalization processing unit 117 by a communication control unit 350.

In the following, a method for controlling the transmission-side waveform equalization processing unit 112 and the reception-side waveform equalization processing unit 117 by the communication control unit 350 in the digital optical communication system 300 according to the third example embodiment is described.

In an optical transmission apparatus, when the number of optical transmitters/receivers is increased, a processable traffic amount proportionally increases. However, when the number of optical transmitters/receivers is increased in order to handle an increase in traffic amount, electric power consumption increases by an amount corresponding to the increased number. FIG. 9 is a graph illustrating a relationship between traffic processing performance (traffic amount) of an optical transmission apparatus to be housed in a station, and electric power consumption in an existing optical communication system. As illustrated in FIG. 9, when a processing amount of traffic in an optical transmission apparatus increases, electric power consumption also proportionally increases. When electric power consumption increases, it is necessary to increase an electric power supply ability of a station, and an investment cost for an electric power facility also increases.

In recent years, in a station for housing mobile traffic or internet of things (IoT) traffic, which tends to remarkably increase, a time-wise change and a place-wise change of a peak value and a bottom value of a traffic amount are extremely large, in terms of characteristics thereof, regardless of a large capacity, and an operation rate of an optical transmitter/receiver in an optical transmission apparatus housed in the station greatly changes. In such a station, installing an electric power facility by taking into consideration a peak value of electric power at which all optical transmitters/receivers are operable leads to a very poor efficiency in facility investment.

Further, in a station for housing a wireless base station in an urban area, and the like, an installation space for an electric power facility may be restricted, in a case where a base station is installed in a limited space within an existing building, and the like. Therefore, the number of optical transmitters/receivers in an optical transmission apparatus to be housed in a station may decrease, and it may be impossible to accommodate a traffic amount that is inherently required. Further, also in terms of a running cost (electricity expense) of a station, signing a contract on use of electricity by taking into consideration a peak value of electric power, which is extremely less likely to be used, leads to a poor efficiency.

Also in an existing technique, when traffic accompanying a time-wise change such as mobile traffic and the like is processed, it becomes possible to increase an electric power efficiency by controlling the number of operating optical transmitters/receivers depending on a traffic amount, as necessary. However, when it is assumed that a maximum value of a traffic amount, which is expected in a case where an optical transmitter/receiver is fully operated by concentration of a traffic amount, is TRmax (see FIG. 9), it is necessary to install in advance an electric power facility capable of supplying electric power equal to or above electric power consumption PTRmax (see FIG. 9), which is associated with TRmax.

On the other hand, in an optical communication system according to the third example embodiment, waveform equalization processing, which is performed in a station for housing an optical transmission apparatus in which a traffic amount becomes equal to or above a certain threshold value, is performed by another station having surplus electric power. When a traffic amount in one of station A and station B communicating with each other becomes equal to or above a predetermined threshold value (TRth), waveform equalization processing which is performed by a waveform equalization processing unit in the one station in a normal state is performed by a waveform equalization processing unit in the other station having surplus electric power.

Specifically, when the communication control unit 350 collects information on a traffic amount and an allowable amount of electric power in each station, determines that a traffic amount in an optical transmission apparatus 101 of the station A becomes equal to or above the predetermined threshold value (TRth), and determines that the station B has sufficient surplus electric power, the communication control unit 350 disables a transmission-side waveform equalization processing unit 112 and a reception-side waveform equalization processing unit 117 of an optical transmitter/receiver 110 in the optical transmission apparatus 101 of the station A in which an additional operation is performed, and enables a transmission-side waveform equalization processing unit 112 and a reception-side waveform equalization processing unit 117 of an optical transmitter/receiver 120 in an optical transmission apparatus 102 of the station B. Contrary to the above, the communication control unit 350 collects information on a traffic amount and an allowable amount of electric power in each station, determines that a traffic amount in the optical transmission apparatus 102 of the station B becomes equal to or above the predetermined threshold value (TRth), and determines that the station A has sufficient surplus electric power, the communication control unit 350 disables the transmission-side waveform equalization processing unit 112 and the reception-side waveform equalization processing unit 117 of the optical transmitter/receiver 120 in the optical transmission apparatus 102 of the station B in which an additional operation is performed, and enables the transmission-side waveform equalization processing unit 112 and the reception-side waveform equalization processing unit 117 of the optical transmitter/receiver 110 in the optical transmission apparatus 101 of the station A.

According to this configuration, it becomes possible to suppress a gradient of increase in electric power consumption in each station. FIG. 10 is a graph illustrating a relationship between a traffic amount (proportional to the number of operating optical transmitters/receivers) of the optical transmission apparatuses 101 and 102 to be housed in the stations A and B, and electric power consumption in the digital optical communication system 300 according to the third example embodiment. As illustrated in FIG. 10, it becomes possible to suppress electric power consumption, which is associated with a maximum value of a traffic amount, to an amount of electric power PTRmax_opt, which is smaller than PTRmax in the existing optical communication system illustrated in FIG. 9.

Note that, in this example, a control example in which effective use of surplus electric power is performed between the station A and the station B is described. The present example embodiment, however, is not limited to the above. For example, waveform equalization processing may be exclusively performed in a station in which surplus electric power is largest among three stations including the station C illustrated in FIG. 5, and there are various combinations.

As described above, even when an operation rate in an optical transmitter/receiver of an optical transmission apparatus greatly changes depending on a traffic amount of an optical transmission apparatus to be housed in each station, it becomes possible to provide a transmission capacity of an optical transmission apparatus in association with an expected maximum traffic amount, and suppress a basic fee in a contract on an electricity rate with an electric power company, while suppressing an investment cost for an electric power facility.

In the above-described example embodiment, the present invention is described as a hardware configuration. The present invention, however, is not limited to the above. In the present invention, each processing is implementable by causing a central processing unit (CPU) to execute a computer program.

In the above-described example, a program is stored by using a non-transitory computer readable medium of various types, and is suppliable to a computer. A non-transitory computer readable medium includes a tangible storage medium of various types. Examples of a non-transitory computer readable medium include a magnetic recording medium (e.g. a flexible disk, a magnetic tape, and a hard disk drive), a magneto-optical recording medium (e.g. a magneto-optical disk), a CD-ROM (Read Only Memory), a CD-R, a CD-R/W, a semiconductor memory (e.g., a mask ROM, a programmable ROM (PROM), an erasable PROM (EPROM), a flash ROM, and a random access memory (RAM)). Further, a program may be supplied to a computer by a transitory computer readable medium of various types. Examples of a transitory computer readable medium include an electric signal, an optical signal, and an electromagnetic wave. A transitory computer readable medium can supply a program to a computer via a wired communication path such as an electric wire and an optical fiber, or a wireless communication path.

Note that the present invention is not limited to the above-described example embodiments, and may be modified as necessary as far as modifications do not depart from the gist of the present invention. For example, in the first example embodiment, a communication control unit performs control of enabling or disabling a transmission-side waveform equalization processing unit and a reception-side waveform equalization processing unit. The present invention, however, is not limited to the above. Specifically, when linear distortion of a certain transmission path is compensated, a distribution ratio of a waveform equalization processing function to be performed by a transmission-side waveform equalization processing unit located on a transmission side of the transmission path, and a reception-side waveform equalization processing unit located on a reception side may be set to any ratio M:N. By performing as described above, it becomes possible to implement control of finer electric power distribution. Note that, it becomes possible to set a distribution ratio of a waveform equalization processing function to be performed by a reception-side waveform equalization processing unit located on a reception side to any ratio M:N, by using a waveform equalization circuit capable of partially bypassing/suspending a circuit block depending on a required waveform equalization performance, in a transmission-side waveform equalization processing unit and in a reception-side waveform equalization processing unit.

A part or the entirety of the above-described example embodiments may be described as the following supplementary notes, but are not limited to the following configuration.

(Supplementary Note 1)

A digital optical communication system provided with: a plurality of optical transmission apparatuses including an optical transmitter/receiver having a reception-side waveform equalization processing unit for performing, on a reception side, equalization processing of compensating waveform distortion occurring in a transmission path, and a transmission-side waveform equalization processing unit for performing, on a transmission side, equalization processing of compensating waveform distortion occurring in a transmission path; and a communication control unit for controlling the reception-side waveform equalization processing unit and the transmission-side waveform equalization processing unit in the optical transmitter/receiver of each optical transmission apparatus, wherein the communication control unit controls the reception-side waveform equalization processing unit and the transmission-side waveform equalization processing unit, in such a way as to cause either the transmission-side waveform equalization processing unit in the optical transmitter/receiver of one of optical transmission apparatuses, or the reception-side waveform equalization processing unit in the optical transmitter/receiver of the other of the optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section.

(Supplementary Note 2)

The digital optical communication system according to supplementary note 1, wherein the communication control unit disables the reception-side waveform equalization processing unit and the transmission-side waveform equalization processing unit in the optical transmitter/receiver of an optical transmission apparatus located at an end portion of an optical transmission apparatus included in a predetermined transmission section.

(Supplementary Note 3)

The digital optical communication system according to supplementary note 1, wherein the communication control unit enables, in the predetermined transmission section, the reception-side waveform equalization processing unit and the transmission-side waveform equalization processing unit in the optical transmitter/receiver of an optical transmission apparatus located at an end portion of an optical transmission apparatus included in the transmission section.

(Supplementary Note 4)

The digital optical communication system according to supplementary note 1, wherein the optical transmission apparatus includes a plurality of the optical transmitters/receivers, the communication control unit increases or decreases a number of the operating optical transmitters/receivers depending on a traffic amount of communication in the optical transmission apparatus, and the communication control unit disables the reception-side waveform equalization processing unit and the transmission-side waveform equalization processing unit of the optical transmitter/receiver in the optical transmission apparatus, when a traffic amount of communication in the optical transmission apparatus exceeds a predetermined value.

(Supplementary Note 5)

The digital optical communication system according to any one of supplementary notes 1 to 4, wherein the communication control unit controls the reception-side waveform equalization processing unit and the transmission-side waveform equalization processing unit in the optical transmitter/receiver of each optical transmission apparatus included in a predetermined transmission section, in such a way as to cause one of optical transmission apparatuses included in a predetermined transmission section to perform equalization processing, so as to change a required amount of electric power of each optical transmission apparatus included in a predetermined transmission section.

(Supplementary Note 6)

A method for controlling a digital optical communication system provided with a plurality of optical transmission apparatuses including an optical transmitter/receiver having a reception-side waveform equalization processing unit for performing, on a reception side, equalization processing of compensating waveform distortion occurring in a transmission path, and a transmission-side waveform equalization processing unit for performing, on a transmission side, equalization processing of compensating waveform distortion occurring in a transmission path, the method including a step of controlling the reception-side waveform equalization processing unit and the transmission-side waveform equalization processing unit, in such a way as to cause either the transmission-side waveform equalization processing unit in the optical transmitter/receiver of one of optical transmission apparatuses, or the reception-side waveform equalization processing unit in the optical transmitter/receiver of the other of the optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section.

(Supplementary Note 7)

The method for controlling the digital optical communication system according to supplementary note 6, wherein, in the above-described step, the reception-side waveform equalization processing unit and the transmission-side waveform equalization processing unit in the optical transmitter/receiver of an optical transmission apparatus located at an end portion of an optical transmission apparatus included in the transmission section are disabled in the predetermined transmission section.

(Supplementary Note 8)

The method for controlling the digital optical communication system according to supplementary note 6, wherein, in the above-described step, the reception-side waveform equalization processing unit and the transmission-side waveform equalization processing unit in the optical transmitter/receiver of an optical transmission apparatus located at an end portion of an optical transmission apparatus included in the transmission section are enabled in the predetermined transmission section.

(Supplementary Note 9)

The method for controlling the digital optical communication system according to supplementary note 6, wherein the optical transmission apparatus includes a plurality of the optical transmitters/receivers, in the above-described step, a number of the operating optical transmitters/receivers is increased or decreased depending on a traffic amount of communication in the optical transmission apparatus, and in the above-described step, the reception-side waveform equalization processing unit and the transmission-side waveform equalization processing unit in the optical transmitter/receiver of the optical transmission apparatus are disabled, when a traffic amount of communication in the optical transmission apparatus exceeds a predetermined value.

(Supplementary Note 10)

A control program of a digital optical communication system provided with a plurality of optical transmission apparatuses including an optical transmitter/receiver having a reception-side waveform equalization processing unit for performing, on a reception side, equalization processing of compensating waveform distortion occurring in a transmission path, and a transmission-side waveform equalization processing unit for performing, on a transmission side, equalization processing of compensating waveform distortion occurring in a transmission path, the control program causing a computer to execute a step of controlling the reception-side waveform equalization processing unit and the transmission-side waveform equalization processing unit, in such a way as to cause either the transmission-side waveform equalization processing unit in the optical transmitter/receiver of one of optical transmission apparatuses, or the reception-side waveform equalization processing unit in the optical transmitter/receiver of the other of the optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section.

(Supplementary Note 11)

The control program according to supplementary note 10, wherein, in the above-described step, the reception-side waveform equalization processing unit and the transmission-side waveform equalization processing unit in the optical transmitter/receiver of an optical transmission apparatus located at an end portion of an optical transmission apparatus included in the transmission section are disabled in the predetermined transmission section.

In the foregoing, the invention of the present application is described by referring to example embodiments. The invention of the present application, however, is not limited to the above-described example embodiments. A configuration and details of the invention of the present application can be modified in various ways comprehensible to a person skilled in the art within the scope of the invention of the present application.

REFERENCE SIGNS LIST

1 Digital optical communication system
2, 3 Optical transmission apparatus
4 Communication control unit
5, 6 Transmission path
10, 20 Optical transmitter/receiver
11 Transmission-side waveform equalization processing unit
12 Reception-side waveform equalization processing unit

The invention claimed is:

1. A digital optical communication system comprising:
a plurality of optical transmission apparatuses each including an optical transmitter/receiver including a reception-side waveform equalization processing unit that performs, on a reception side, equalization processing that compensates for waveform distortion occurring in a first transmission path, and a transmission-side waveform equalization processing unit that performs, on a transmission side, equalization processing that compensates for waveform distortion occurring in a second transmission path; and
a communication control unit that controls the reception-side waveform equalization processing unit and the transmission-side waveform equalization processing unit in the optical transmitter/receiver of each optical transmission apparatus, wherein
the communication control unit controls the reception-side waveform equalization processing unit and the transmission-side waveform equalization processing unit, in such a way as to cause either the transmission-side waveform equalization processing unit in the optical transmitter/receiver of one of the optical transmission apparatuses, or the reception-side waveform equalization processing unit in the optical transmitter/receiver of another of the optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section.

2. The digital optical communication system according to claim 1, wherein
the communication control unit disables the reception-side waveform equalization processing unit and the transmission-side waveform equalization processing unit in the optical transmitter/receiver of an optical transmission apparatus located at an end portion among optical transmission apparatuses included in the predetermined transmission section.

3. The digital optical communication system according to claim 1, wherein
the communication control unit enables, in the predetermined transmission section, the reception-side waveform equalization processing unit and the transmission-side waveform equalization processing unit in the optical transmitter/receiver of an optical transmission apparatus located at an end portion among optical transmission apparatuses included in the predetermined transmission section.

4. The digital optical communication system according to claim 1, wherein
each of the plurality of optical transmission apparatuses includes a plurality of the optical transmitters/receivers,
the communication control unit increases or decreases a number of operating optical transmitters/receivers depending on a traffic amount of communication in said one of the optical transmission apparatuses, and
the communication control unit disables the reception-side waveform equalization processing unit and the transmission-side waveform equalization processing unit of the optical transmitter/receiver in said another of the optical transmission apparatuses, when a traffic amount of communication in said another of the optical transmission apparatuses exceeds a predetermined value.

5. The digital optical communication system according to claim 1, wherein
the communication control unit controls the reception-side waveform equalization processing unit and the transmission-side waveform equalization processing unit in the optical transmitter/receiver of each optical transmission apparatus included in the predetermined transmission section, in such a way as to cause one of optical transmission apparatuses included in the predetermined transmission section to perform equalization processing, and as to change a required amount of electric power of each optical transmission apparatus included in the predetermined transmission section.

6. A method for controlling a digital optical communication system provided with a plurality of optical transmission apparatuses each including an optical transmitter/receiver including a reception-side waveform equalization processing unit that performs, on a reception side, equalization processing that compensates for waveform distortion occurring in a first transmission path, and a transmission-side waveform equalization processing unit that performs, on a transmission side, equalization processing that compensates for waveform distortion occurring in a second transmission path, the method comprising
a step of controlling the reception-side waveform equalization processing unit and the transmission-side waveform equalization processing unit, in such a way as to cause either the transmission-side waveform equalization processing unit in the optical transmitter/receiver of one of the optical transmission apparatuses, or the reception-side waveform equalization processing unit in the optical transmitter/receiver of another of the optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section.

7. The method for controlling a digital optical communication system according to claim 6, wherein,
the reception-side waveform equalization processing unit and the transmission-side waveform equalization processing unit in the optical transmitter/receiver of an optical transmission apparatus located at an end portion among optical transmission apparatuses included in the predetermined transmission section are disabled in the predetermined transmission section.

8. The method for controlling a digital optical communication system according to claim 6, wherein,
the reception-side waveform equalization processing unit and the transmission-side waveform equalization processing unit in the optical transmitter/receiver of an optical transmission apparatus located at an end portion among the optical transmission apparatuses included in the transmission section are enabled in the predetermined transmission section.

9. The method for controlling a digital optical communication system according to claim 6, wherein
each of the plurality of optical transmission apparatuses includes a plurality of the optical transmitters/receivers,
a number of operating optical transmitters/receivers is increased or decreased depending on a traffic amount of communication in said one of the optical transmission apparatuses, and
the reception-side waveform equalization processing unit and the transmission-side waveform equalization processing unit in the optical transmitter/receiver of said another of the optical transmission apparatuses are disabled, when a traffic amount of communication in said another of the optical transmission apparatuses exceeds a predetermined value.

10. A non-transitory computer-readable recording medium recording a control program of a digital optical communication system provided with a plurality of optical transmission apparatuses each including an optical transmitter/receiver including a reception-side waveform equalization processing unit that performs, on a reception side, equalization processing that compensates for waveform distortion occurring in a first transmission path, and a transmission-side waveform equalization processing unit that performs, on a transmission side, equalization processing that compensates for waveform distortion occurring in a second transmission path, the control program causing a computer to execute
a step of controlling the reception-side waveform equalization processing unit and the transmission-side waveform equalization processing unit, in such a way as to cause either the transmission-side waveform equalization processing unit in the optical transmitter/receiver of one of the optical transmission apparatuses, or the reception-side waveform equalization processing unit in the optical transmitter/receiver of another of the optical transmission apparatuses, to perform equalization processing, based on information relating to an amount of electric power suppliable to each optical transmission apparatus included in a predetermined transmission section, between optical transmission apparatuses communicating with each other by respective transmission paths included in the predetermined transmission section.

11. The non-transitory computer-readable recording medium according to claim 10, wherein,
the reception-side waveform equalization processing unit and the transmission-side waveform equalization processing unit in the optical transmitter/receiver of an optical transmission apparatus located at an end portion among the optical transmission apparatuses included in the predetermined transmission section are disabled in the predetermined transmission section.

12. The digital optical communication system according to claim 2, wherein the communication control unit controls the reception-side waveform equalization processing unit and the transmission-side waveform equalization processing unit in the optical transmitter/receiver of each optical transmission apparatus included in the predetermined transmission section, in such a way as to cause one of the optical transmission apparatuses included in the predetermined transmission section to perform equalization processing, and as to change a required amount of electric power of each optical transmission apparatus included in the predetermined transmission section.

13. The digital optical communication system according to claim 3, wherein the communication control unit controls the reception-side waveform equalization processing unit and the transmission-side waveform equalization processing unit in the optical transmitter/receiver of each optical transmission apparatus included in the predetermined transmission section, in such a way as to cause one of the optical transmission apparatuses included in the predetermined transmission section to perform equalization processing, and as to change a required amount of electric power of each optical transmission apparatus included in the predetermined transmission section.

14. The digital optical communication system according to claim 4, wherein the communication control unit controls the reception-side waveform equalization processing unit and the transmission-side waveform equalization processing unit in the optical transmitter/receiver of each optical transmission apparatus included in the predetermined transmission section, in such a way as to cause one of the optical transmission apparatuses included in the predetermined transmission section to perform equalization processing, and as to change a required amount of electric power of each optical transmission apparatus included in the predetermined transmission section.

* * * * *